(12) United States Patent
Gupta et al.

(10) Patent No.: US 10,996,944 B2
(45) Date of Patent: May 4, 2021

(54) AUTOMATED SOFTWARE SELECTION USING MATRIX FACTORIZATION

(71) Applicant: Red Hat, Inc., Raleigh, NC (US)

(72) Inventors: Avishkar Gupta, Noida (IN); Aagam Shah, Ahmedabad (IN); Sarah Masud, New Delhi (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/532,695

(22) Filed: Aug. 6, 2019

(65) Prior Publication Data

US 2020/0356360 A1    Nov. 12, 2020

(30) Foreign Application Priority Data

May 6, 2019  (IN) .............................. 201911018104

(51) Int. Cl.
*G06F 8/71* (2018.01)
*G06F 17/16* (2006.01)
*G06N 20/00* (2019.01)

(52) U.S. Cl.
CPC .............. *G06F 8/71* (2013.01); *G06F 17/16* (2013.01); *G06N 20/00* (2019.01)

(58) Field of Classification Search
USPC ......................................................... 717/121
See application file for complete search history.

(56) References Cited

U.S. PATENT DOCUMENTS

| 8,880,439 | B2 | 11/2014 | Archambeau et al. |
| 8,938,484 | B2 * | 1/2015 | Starhill ................... G06F 17/16 708/520 |
| 10,255,628 | B2 | 4/2019 | Li et al. |
| 2004/0093593 | A1 * | 5/2004 | Jhanwar ................... G06F 8/71 717/169 |

(Continued)

FOREIGN PATENT DOCUMENTS

CN    108304556 A    7/2018

OTHER PUBLICATIONS

Gopalan, P., et al., "Bayesian Nonparametric Poisson Factorization for Recommendation Systems," Princeton University and University Carlos III in Madrid, 2014 http://proceedings.mlr.press/v33/gopalan14.pdf.

(Continued)

*Primary Examiner* — John Q Chavis
(74) *Attorney, Agent, or Firm* — Kilpatrick Townsend & Stockton LLP

(57) ABSTRACT

A processing device can establish a machine learning model to produce software dependency recommendations. The model can be periodically retrained to update its knowledge of available dependencies. The software dependencies can be incorporated into software by developers who receive the selection or automatically by an intelligent software development platform. A processing device can train the model by assembling sparse user data based on feedback corresponding to software dependencies to produce a vector of preferences for each user. The processing device can also generate (Continued)

a latent vector of attributes for each software dependency. The processing device can then apply matrix factorization to the vectors to produce a behavior matrix that is used to train the machine learning model.

20 Claims, 5 Drawing Sheets

(56) References Cited

U.S. PATENT DOCUMENTS

| | | | | |
|---|---|---|---|---|
| 2004/0255291 | A1* | 12/2004 | Sierer | G06F 8/61 |
| | | | | 717/174 |
| 2012/0151469 | A1* | 6/2012 | Wookey | G06F 8/658 |
| | | | | 717/175 |
| 2015/0268948 | A1* | 9/2015 | Plate | G06F 21/577 |
| | | | | 717/123 |
| 2016/0110183 | A1* | 4/2016 | Fu | H04L 67/34 |
| | | | | 717/169 |
| 2016/0117161 | A1* | 4/2016 | Parthasarathy | G06F 8/65 |
| | | | | 717/171 |
| 2017/0103133 | A1 | 4/2017 | Xiong et al. | |
| 2017/0177714 | A1* | 6/2017 | Franceschini | G06F 16/9024 |
| 2018/0232661 | A1* | 8/2018 | Li | G06F 17/16 |
| 2018/0330192 | A1 | 11/2018 | Atasu et al. | |
| 2018/0336457 | A1* | 11/2018 | Pal | G06F 16/9024 |

OTHER PUBLICATIONS

Gopalan, P., et al., "Scalable Recommendation with Hiearchical Poisson Factorization," Princeton University and Columbia University, 2015, http://jakehofman com/inprint/poisson recs.pdf.

* cited by examiner

AUTOMATED SOFTWARE SELECTION USING MATRIX FACTORIZATION

CROSS-REFERENCE TO RELATED APPLICATION

This application claims priority to India Application No. 201911018104, titled "Automated Software Selection Using Matrix Factorization" and filed on May 6, 2019, the entirety of which is incorporated herein by reference.

TECHNICAL FIELD

The present disclosure relates generally to software development tools. More specifically, but not by way of limitation, this disclosure relates to providing a software developer with automated, machine-learning-based selections of software that takes the form of pre-existing application dependencies that a developer can use to implement various functions.

BACKGROUND

In software development, software dependencies are pre-existing code modules available to the developer to carry out a needed function. A software dependency often takes the form of a pre-existing software package or library to handle some task. For example, a pre-existing package for audio processing might be acquired and used by a software developer to implement the audio tasks in a videoconferencing application. Software dependencies can also take the form of a service deployed in a cloud or on a server to provide some function. In such a case, the pre-existing code module runs remotely and transparently, and the developer treats the service as the dependency.

DETAILED DESCRIPTION

Figure 1:
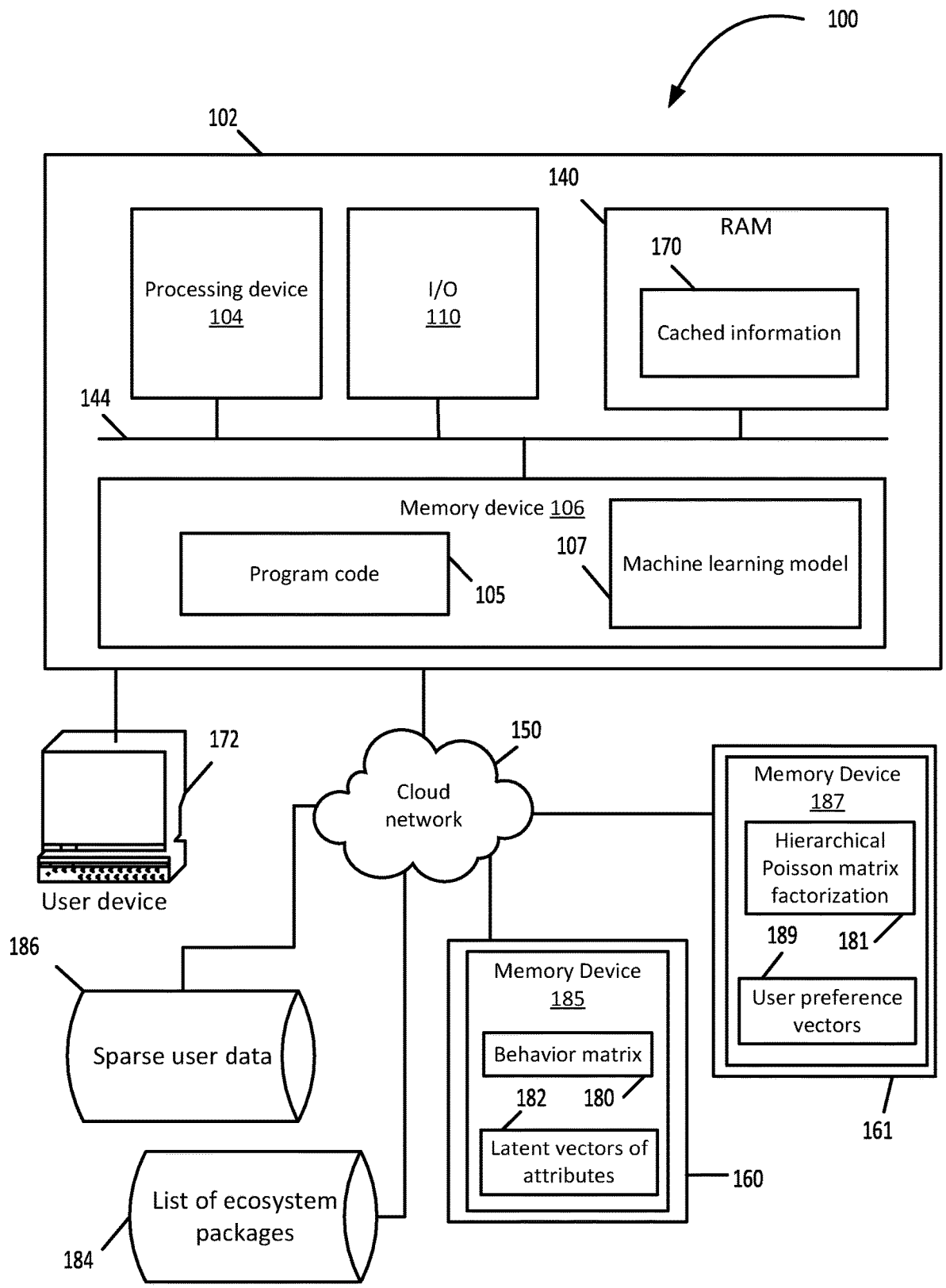
FIG. 1 is a block diagram of an example of a system that provides automated software dependency selection according to some aspects of the disclosure.

A software dependency can take the form of a pre-existing software package to handle some task within or for an application. For example, a pre-existing package for audio processing might be acquired and used by a software developer to implement the audio tasks in a videoconferencing application. A software dependency can also take the form of a software library. Modern software development relies on software dependencies and software developers can find it difficult to choose from the growing number of dependencies available for a given task. Algorithms for making user recommendations based on past behavior have been developed in other fields (e.g., shopping), but these algorithms tend to be computationally expensive and inapplicable to software development.

Some examples of the present disclosure overcome one or more of the issues mentioned above by providing a trained, machine learning model that can select software dependencies for an application under development. The model can be periodically retrained to update its knowledge of available dependencies. The software dependencies can be incorporated into software applications by developers or automatically by an intelligent software development platform. Aspects and features of this disclosure take advantage of the fact the user data for software dependencies is typically sparse data, meaning a behavior matrix based on the data would have many zeros. Existing algorithms for providing user recommendations, for example those relying on implicit alternating least squares (ALS) or Bayesian personalized ranking (BPS), require iterating over at least some zero combinations in order to compute loss functions. Aspects and features of this disclosure allow the sum of predictions for all combinations of users and items to be quickly calculated because the matrix factorization does not need to perform calculations where a behavior matrix entry is equal to zero in order to determine a Poisson log-likelihood. Thus, dependency package recommendations can be calculated more quickly or with less processing power, as compared to using other types of probability distributions.

Some examples of the present disclosure establish a machine learning model to produce software dependency recommendations. As an example, a processing device in a system can assemble sparse user data based on feedback corresponding to a plurality of software dependencies to produce a vector of preferences for each user. The processing device can generate a latent vector of attributes for each software dependency of the plurality of software dependencies. The processing device can then apply matrix factorization to the latent vector of attributes and the vector of preferences to produce a behavior matrix. A machine learning model models the behavior matrix and produces software dependency recommendations.

In some examples, hierarchical Poisson matrix factorization is used. In some examples, the system accesses manifests corresponding to the software dependencies to produce the vector of preferences. In some examples, recommendations are produced when user input of an application stack is received.

If a user is a new user, there may not be enough data to indicate preferences. In some examples, sparse user data is assembled based on view data. View data is data pertaining to the dependency packages for which the user has initially viewed information. In some examples, if the view data is not available, the system initially uses global popularity data to assemble the sparse user data.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is an example of a system 100 that provides automated software dependency selection according to some aspects of the disclosure. More specifically, the system 100 includes a computing device 102. Examples of the computing device 102 can include a server, laptop computer, desktop computer, or any combination of these. The computing device 102 can execute software as defined below, which causes computing device 102 to perform the tasks of training and retraining a machine learning model to provide automated software dependency selection according to some aspects of the disclosure. Software can include computer-readable instructions that are executable by a processing device 104, such as program code instructions 105. Program code instructions 105 carry out training of the machine learning model 107 and manage the process of interacting with users and making recommendations. The system can be programmed in any suitable programming language, such as Java, C++, C, Python, or any combination of these. Note that the software that implements dependency selection as described in an exemplary fashion herein is distinct from the software that makes up dependencies or the application for which dependencies are being selected.

In FIG. 1, computing device 102 includes the processing device 104, memory device 106, an input/output (I/O) module or modules 110, and a random-access memory (RAM) 140. A bus or interconnect 144 is also provided to allow for inter- and intra-device communications using, for example, I/O module 110. I/O module 110 can include a network interface (not shown), which in turn communicates with cloud network 150. Cloud network 150 connects computing device 102 to cloud servers 160 and 161, which in this example can provide some of the functions used to train the machine learning model 107. Cloud servers 160 and 161 can also store certain intermediate files used during the training process. Each cloud server includes a processing device, a memory device, I/O, and other components similar to computing device 102 and other typical computing devices. Cloud server 160 includes behavior matrix 180. The behavior matrix 180 is captured from a Poisson distribution and is stored in memory device 185 of cloud server 160. Also stored in memory device 185 of cloud server 160 are latent vectors 182, which include the attributes of dependencies. These vectors 182 can built from list 184 defining ecosystem packages available from on-line repositories. The list typically includes many software dependencies and the various types of descriptive information available for each dependency.

Still referring to FIG. 1, cloud server 161 includes a memory device 187, in which computer program instructions 181 that perform hierarchical Poisson matrix factorization are stored. Hierarchical Poisson matrix factorization can be used to combine user preference vectors 189 with the latent vectors of attributes 182 from cloud server 160. In the example of FIG. 1, cached information 170, such as vectors, probability distributions, and other information used by system 100 may be stored in RAM 140. In addition to connecting computing device 102 to cloud servers 160 and 161, cloud network 150 also connects computing device 102 to user device 172, which may be a personal computer, smartphone, tablet computer, or some other type of client device. User input can be received by computing device 102 through user device 172. Additionally, selected dependency recommendations can be displayed to a user on user device 172. User input and display functions can alternatively or additionally be provided through peripherals (not shown) locally attached to computing device 102.

In typical development environments, most users only view, select, or buy a handful of items out of all the available packages in the catalog of dependencies, resulting in sparse user data. The behavior matrix of user-item interactions is therefore typically sparse as well. Most entries are zero. For purposes of this disclosure, sparse user data is user data that would result in a behavior matrix with a majority of entries being zero. Algorithms relying on implicit alternating least squares (ALS) or Bayesian personalized ranking (BPS) require iterating over at least some of the zero combinations in order to compute loss functions, wasting time, computational power, or both. By contrast, with hierarchical Poisson matrix factorization, the Poisson likelihood is given by the formula:

$$L(y)=\hat{y}e^{\hat{y}}/y!.$$

Taking the logarithm (log-likelihood), the above equation becomes:

$$l(y)=-\log(y!)+y\log(\hat{y})-\hat{y}.$$

Since log(0!)=0 and 0*log of any number is zero, the sum of predictions for all combinations of users and items can be quickly calculated because the model does not need to perform calculations where the behavior matrix entry is equal to zero in order to determine a Poisson log-likelihood.

Statistical characteristics that can be derived from real-world user behavior data include the distribution of user activity (i.e., how many items a user retrieves or buys) and the distribution of item popularity (i.e., how many users acquire an item). These distributions tend to be long-tailed: while most users consume few items, a few "tail users" consume many items. A hierarchical Poisson matrix factorization model captures data for these "tail" users very well as compared to other statistical distribution models. This characteristic of hierarchical Poisson matrix factorization models allows the system according to some aspects to model behavior that can account for the intent of the developers.

Another advantage of a hierarchical Poisson matrix factorization model is that it implicitly down-weighs the contribution of the items that users do not consume. With an appropriate fit to user activity, the model has two ways of accounting for an unconsumed item: either the user is not interested in it or the user would be interested in it but the user is likely to be inactive with respect to further software development. In contrast, a user that consumes an item can be assumed to be interested in the item. Thus, the hierarchical Poisson matrix factorization model benefits from assuming a consumed user/item pair is more similar to other consumed user/item pairs than to unconsumed user/item pairs even though the unconsumed user/item pairs may have other common characteristics.

Figure 2:
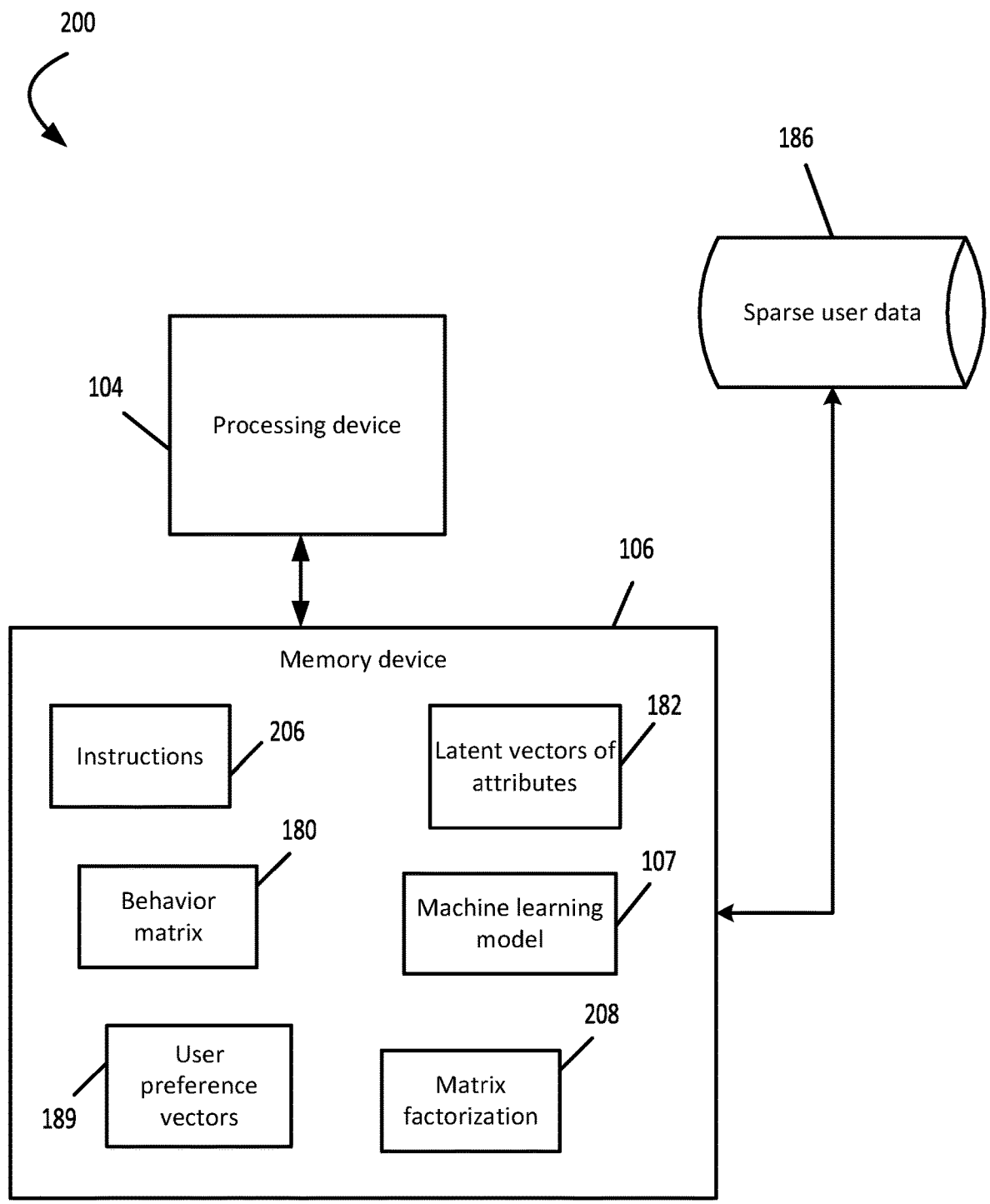
FIG. 2 is a block diagram of another example of a system that provides automated software dependency selection according to some aspects of the disclosure.

FIG. 2 is a block diagram of an example of a system 200 that provides automated software dependency selection according to some aspects of the disclosure. The system 200 includes the processing device 104 that can execute computer program code, also referred to as instructions or program code instructions, for performing operations related to training a machine learning model and using the machine learning model providing automated software dependency selection. Processing device 104 is communicatively coupled to the memory device 106. The processing device 104 can include one processing device or multiple processing devices. Non-limiting examples of the processing device 104 include a field-programmable gate array (FPGA), an application-specific integrated circuit (ASIC), a microprocessor, etc. The processing device 104 can execute one or more operations for generating user preference vectors and latent vectors of software package attributes. The processing device 104 can execute program code instructions 206 stored in the memory device 106 to train the machine learning model and use the machine learning model to select software dependencies and recommend the selected software dependencies. Processing device 104 can also execute instructions 208, which perform matrix factorization.

Memory device 106 can include one memory device or multiple memory devices. The memory device 106 can be non-volatile and may include any type of memory device that retains stored information when powered off. In some examples, at least some of the memory device can include a non-transitory computer-readable medium from which the processing device 104 can read instructions 206 as well as the instructions for hierarchical Poisson matrix factorization. A computer-readable medium can include electronic, optical, magnetic, or other storage devices capable of providing the processing device with computer-readable instructions 206 or other program code. Non-limiting examples of the memory device 106 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 106 can also include stored lists, vectors, and other information needed to train and retrain machine learning model 107. The system of FIG. 2 differs from the system of FIG. 1 in that the system of FIG. 2 includes more local resources to train the machine learning model, whereas the system of FIG. 1 relies on cloud resources to provide, as an example, the matrix factorization. Machine learning model 107 can be stored and trained in memory device 106 in either case. Use of cloud resources as shown in FIG. 1 may reduce training time for machine learning model 107 as compared to not using cloud resources as illustrated in FIG. 2. The system of FIG. 2 uses the same, sparse user data 186 as shown in FIG. 1. The latent vectors of attributes 182, behavior matrix 180, user preference vectors 189 are all stored in memory device 106 in the example shown in FIG. 2. Although FIGS. 1 and 2 depict a certain arrangement of components for illustrative purposes, other examples can include any number and combination of these components arranged in any suitable configuration.

Figure 3:
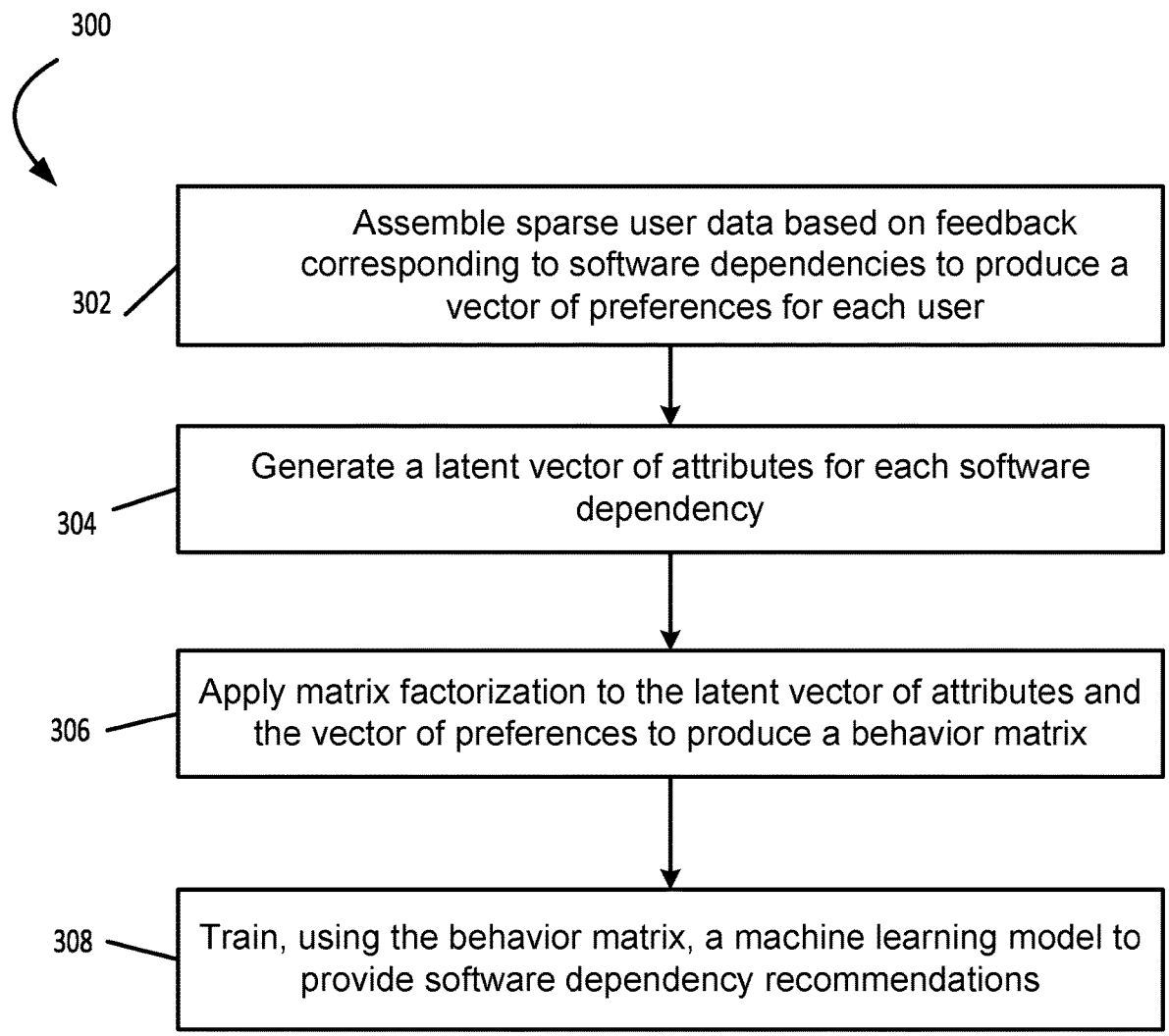
FIG. 3 is a flowchart of an example of a process for providing automated software dependency selection according to some aspects of the disclosure.

In some examples, a processing device can perform one or more of the operations shown in FIG. 3 to provide automated software dependency selection using a machine learning model according to some aspects of the disclosure. In other examples, the computing device can implement more operations, fewer operations, different operations, or a different order of the operations depicted in FIG. 3. Process 300 of FIG. 3 is described below with reference to software components discussed above.

In block 302 of FIG. 3, the processing device assembles sparse user data based on feedback corresponding to software dependencies to produce a vector of preferences 189 for each user. At block 304, the processing device generates a latent vector of attributes for each software dependency to produce latent vectors 182. At block 306, the processing device applies the matrix factorization model (computer program instructions 208) to the latent vectors 182 and the vector of preferences 189 to produce a behavior matrix 180. At block 308, the processing device uses the behavior matrix 180 to train the machine learning model 107 to produce software dependency recommendations. The machine learning model 107 can be retrained at regular intervals based on updated software dependencies, which includes both updates to information about existing dependencies and new dependencies.

Figure 4:
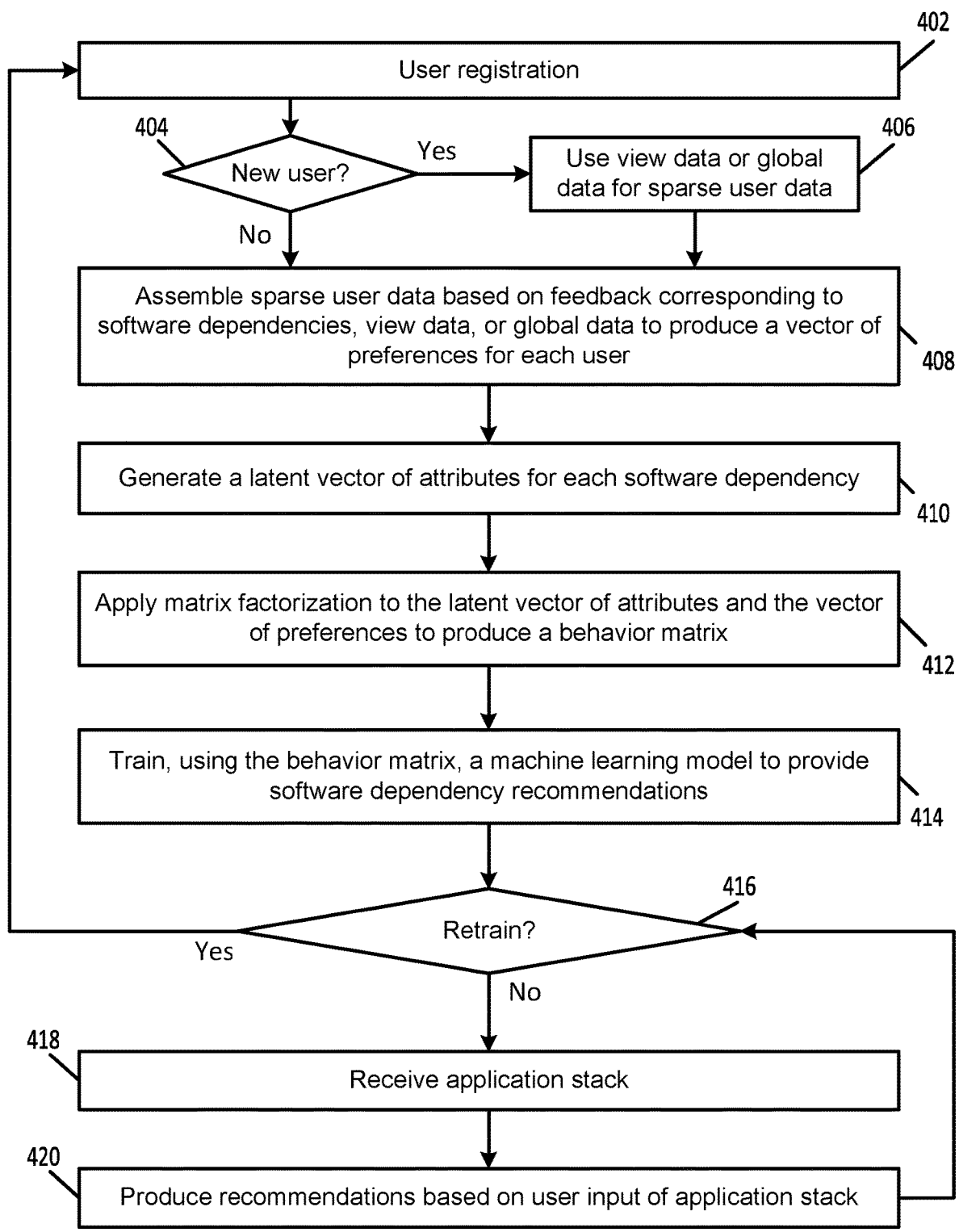
FIG. 4 is a flowchart of another example of a process for providing automated software dependency selection according to some aspects of the disclosure.

As an example of producing software dependency recommendations, a computing device such as processing device 104 can perform the operations of process 400 shown in FIG. 4. At block 402, a user registers with the system to receive recommendations. At block 404 a determination is made as to whether the user is a new user. In the case of a new user, there may not be enough historical user data available to carry out the process based on known user preferences. When the user is a new user, alternative data is used to train the machine learning model for the first time at block 406. In some cases, the system can access and use view data that shows the packages for which the user has viewed information immediately after registering. If view data is not available, the machine learning model can be initially trained with global popularity data. Global popularity data is data that indicates which software dependency packages are globally most popular. In some aspects, adding a new user to the system is as easy as updating the preference (Θ) matrix for the user, which is not as computationally costly as it might be with other types of statistical models. Recommendations for a new user can therefore be generated in substantially real time as opposed to waiting for retraining based on the users indicated preferences.

Still referring to FIG. 4, in block 408 of FIG. 4, the processing device assembles available user data corresponding to software dependencies to produce a vector of preferences for each user. At block 410, the processing device generates a latent vector of attributes for each software dependency to produce latent vectors 182. At block 412, the processing device applies the hierarchical Poisson matrix factorization model 181 to the latent vector of attributes and the vector of preferences to produce a behavior matrix. At block 414, the processing device uses the behavior matrix to train the machine learning model 107 to produce software dependency recommendations by modeling the behavior matrix.

At this point in process 400, the machine learning model is trained and can provide recommendations upon request. At block 416, if the model needs to be retrained due to the passage of time, the training part of process 400 repeats. Otherwise, if processing device 104 receives the specifics of an application stack at block 418, which is submitted by a user to request recommendations, one or more recommendations are produced at block 420 for the submitting user based on the contents of application stack and what the model determines will likely be preferred by that specific user.

Data can be obtained by collecting manifest files from a public source and treating each manifest as a separate item. The hierarchical Poisson matrix factorization model captures sparse user behavior data and large user/item matrices where each user has provided feedback on only a small subset of items. In more detail, the Poisson factorization is a probabilistic model of users and items. It associates each user with a latent vector of preferences, associates each item with a latent vector of attributes, and constrains both kinds of vectors to be sparse and non-negative. Each cell of the observed behavior matrix is assumed to be drawn from a Poisson distribution and have an exponential family distribution over non-negative integers. The distribution has a parameter that is a linear combination of the corresponding user preferences and item attributes. The main computational problem is posterior inference. Given an observed matrix of user behavior, the process discovers the latent attributes that describe the items and the latent preferences of the users. A spike in the preference vector implies that the user tends to like items with the corresponding latent attribute. The process according to some aspects takes into account each unique manifest file as a unique user and each unique package present in any of the manifest file(s) as a unique item. The hierarchical Poisson matrix factorization is then used to model the behavior of users and items. This process is illustrated in the flow diagram and flowchart described below.

Figure 5:
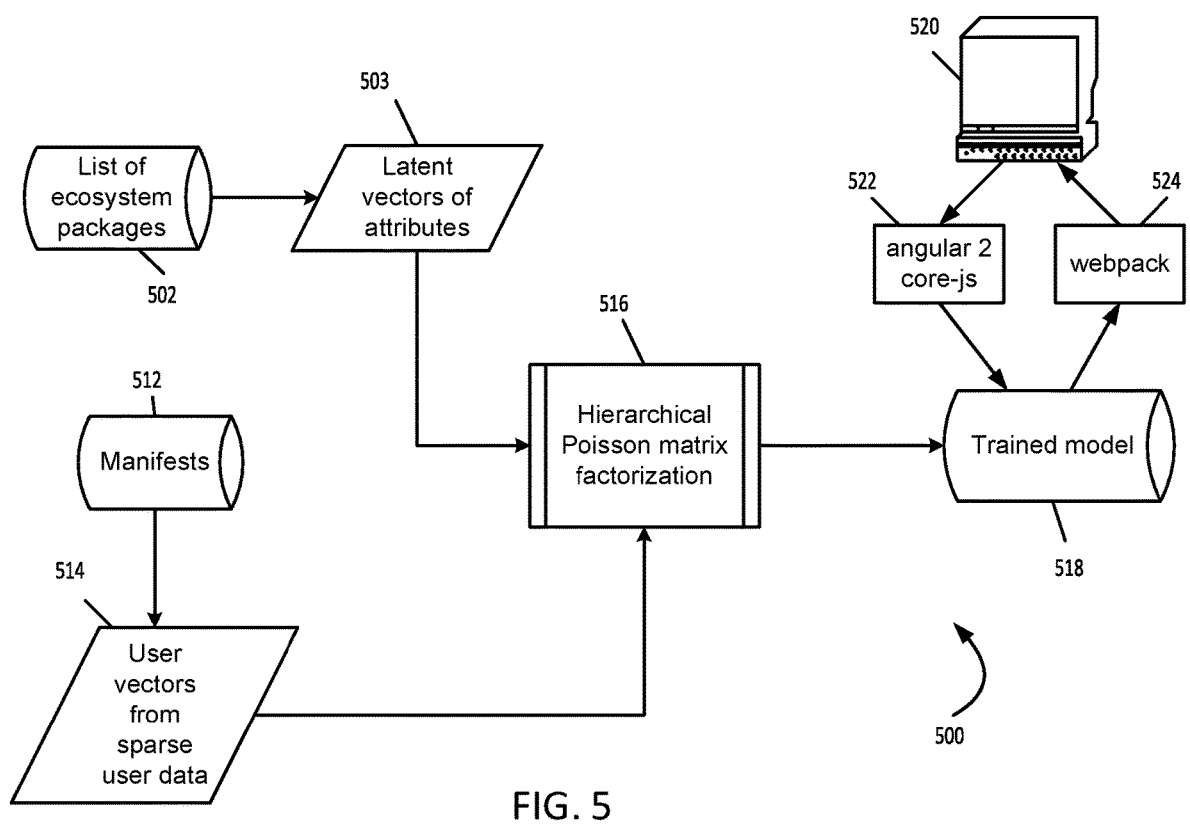
FIG. 5 is an entity data flow diagram showing an example of the training and use of a machine learning model for software package selection according to some aspects of the disclosure.

FIG. 5 is an entity data flow diagram showing the training and use of a machine learning model for software package selection according to some aspects of the disclosure. In this example, ecosystem includes software packages as dependencies for application software and a developer is seeking to obtain a recommendation of a software package. In data flow 500, the software package registry includes a list 502 of ecosystem software packages. The list 502 is used to produce a latent vector of attributes for each package, resulting in a latent vectors of attributes 503 for at least a subset of the packages available.

Still referring to data flow 500 of FIG. 5, data is provided to the model by accessing manifests 512 from a public source such as Github, where each manifest is treated as a separate item. Each item can be represented as a collection of the dependencies that are present in a manifest. The users of each package are represented by user vectors 514 from the sparse user data available for each package described by a manifest. The two types of vectors can then be fed to a hierarchical Poisson matrix factorization model 516. Hierarchical Poisson matrix factorization model 516 is used to combine the latent vectors 503 with user vectors 514. Trained, machine learning model 518 is produced by the hierarchical Poisson matrix factorization model by imposing a conjugate prior and obtaining the optimal hyper parameter values to produce a completed rating matrix. The hierarchical Poisson matrix factorization model is described herein as an example. Other types of matrix factorization can be used if it results in the avoidance of unnecessary processing of matrix entries.

Once the machine learning model has been trained as shown in FIG. 5, a developer can, through user device 520, submit an application stack to the system to obtain a recommendation. In this particular example, the application stack 522 already includes references to the core-js and the angular-2 packages. Trained model 518 selects a software package 524 called webpack and recommends this package to the application developer through user device 520.

The trained machine learning model uses representations of users and packages to select dependencies to suggest to developers. Generating these representations relies initially on receiving or information about the content of dependencies that may be recommended. These software dependencies have no inherent content that can be used, therefore in at least some aspects, a dependency is represented using the intent fulfilled by the dependency. A software dependency can be thought of as serving the intent that is formed by the combination of the metatags associated with the dependency itself, since each of its own dependencies contributes some functionality to the intention of the software dependency itself.

Unless specifically stated otherwise, it is appreciated that throughout this specification that terms such as "operations," "processing," "computing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
a memory device including instructions that are executable by the processing device for causing the processing device to perform operations comprising:
producing a plurality of software dependencies using at least one manifest file describing a plurality of software packages;
assembling sparse user data based on feedback corresponding to the plurality of software dependencies to produce a vector of preferences for each user;
generating a latent vector of attributes for each software dependency of the plurality of software dependencies;
applying matrix factorization to the latent vector of attributes and the vector of preferences to produce a behavior matrix;
receiving user input of an application stack; and
producing a software dependency recommendation based on the application stack, the software dependency recommendation produced using a machine learning model of the behavior matrix.

2. The system of claim 1 wherein the matrix factorization comprises hierarchical Poisson matrix factorization.

3. The system of claim 1 wherein the operations further comprise collecting a plurality of manifest files from a public source.

4. The system of claim 1 wherein the operations further comprise training the machine learning model.

5. The system of claim 4 wherein the operations further comprise retraining the machine learning model to produce the software dependency recommendation based on updated software dependencies.

6. The system of claim 1 wherein the operations further comprising:
determining if a user is a new user; and
accessing view data to assemble the sparse user data when the user is a new user.

7. The system of claim 6 wherein the operations further comprise using global popularity data to assemble the sparse user data when the user is a new user.

8. A method comprising:
producing, using a processor, a plurality of software dependencies using at least one manifest file describing a plurality of software packages;
assembling, by the processor, sparse user data based on feedback corresponding to the plurality of software dependencies to produce a vector of preferences for each user;
generating, by the processor, a latent vector of attributes for each software dependency of the plurality of software dependencies;
applying, by the processor, matrix factorization to the latent vector of attributes and the vector of preferences to produce a behavior matrix;
receiving, by the processor, user input of an application stack; and
producing, by the processor, a software dependency recommendation based on the application stack, the software dependency recommendation produced using a machine learning model of the behavior matrix.

9. The method of claim 8 wherein the matrix factorization comprises hierarchical Poisson matrix factorization.

10. The method of claim 8 further comprising collecting a plurality of manifest files from a public source.

11. The method of claim 8 further comprising training the machine learning model.

12. The method of claim 11 further comprising retraining the machine learning model to produce the software dependency recommendation based on updated software dependencies.

13. The method of claim 8 further comprising:
determining when a user is a new user;
accessing view data to assemble the sparse user data when the user is a new user; and
using global popularity data to assemble the sparse user data when the user is a new user and when view data is not available.

14. A non-transitory computer-readable medium comprising program code that is executable by a processing device for causing the processing device to:
produce a plurality of software dependencies using at least one manifest file describing a plurality of software packages;
assemble sparse user data based on feedback corresponding to the plurality of software dependencies to produce a vector of preferences for each user;
generate a latent vector of attributes for each software dependency of the plurality of software dependencies;
apply matrix factorization to the latent vector of attributes and the vector of preferences to produce a behavior matrix;
receive user input of an application stack; and
produce a software dependency recommendation based on the application stack, the software dependency recommendation produced using a machine learning model of the behavior matrix.

15. The non-transitory computer-readable medium of claim 14 wherein the matrix factorization comprises hierarchical Poisson matrix factorization.

16. The non-transitory computer-readable medium of claim 14 wherein the program code is executable by the processing device to cause the processing device to collect a plurality of manifest files from a public source.

17. The non-transitory computer-readable medium of claim 14 wherein the program code is executable by the processing device to cause the processing device to train the machine learning model.

18. The non-transitory computer-readable medium of claim 17 wherein the program code is executable by the processing device to cause the processing device to retrain the machine learning model to produce the software dependency recommendation based on updated software dependencies.

19. The non-transitory computer-readable medium of claim 14 wherein the program code is executable by the processing device to cause the processing device to:
determine when a user is a new user; and
access view data to assemble the sparse user data when the user is a new user.

20. The non-transitory computer-readable medium of claim 19 wherein the program code is executable by the processing device to cause the processing device to use global popularity data to assemble the sparse user data when the user is a new user.

* * * * *